United States Patent [19]

Tannenbaum

[11] Patent Number: 4,711,802

[45] Date of Patent: Dec. 8, 1987

[54] AQUEOUS INK FOR USE ON FLUOROCARBON SURFACES

[75] Inventor: Harvey P. Tannenbaum, Philadelphia, Pa.

[73] Assignee: E. I. Du Pont de Nemours and Company, Wilmington, Del.

[21] Appl. No.: 896,192

[22] Filed: Aug. 14, 1986

[51] Int. Cl.$^4$ .................. B32B 5/16; B32B 27/08
[52] U.S. Cl. .................. 428/207; 106/22; 106/23; 106/308 M; 106/308 Q; 428/324; 428/422
[58] Field of Search .............. 427/261; 428/421, 422, 428/195, 207, 324, 463; 106/22, 23, 308 Q, 308 M

[56] References Cited

U.S. PATENT DOCUMENTS

| | | | |
|---|---|---|---|
| 3,085,912 | 4/1963 | Friese | 427/261 X |
| 4,049,863 | 9/1977 | Vassiliou | 428/324 |
| 4,123,401 | 10/1978 | Berghmans et al. | 428/463 X |
| 4,351,882 | 9/1982 | Concannon | 428/422 |

Primary Examiner—Thomas J. Herbert

[57] ABSTRACT

A water based ink for printing on fluorocarbon surfaces is disclosed. The ink contains 1.5 to 4.0 weight percent of an acrylic copolymer thixotropic agent, from 2.0 to 3.0 parts of a fluorocarbon resin powder, 1.3 to 3.3 parts of a non-ionic surfactant, 4.0 to 5.0 parts of an alcohol containing 7–12 carbon atoms, from 10 to 15 parts of ethylene glycol, up to 10 parts of a pigment and the remainder water.

2 Claims, No Drawings

AQUEOUS INK FOR USE ON FLUOROCARBON SURFACES

FIELD OF THE INVENTION
BACKGROUND

The present invention relates to an aqueous ink for application to fluorocarbon surfaces. The ink contains a fluorocarbon binder, a polymeric thixotropic agent, a surfactant, a pigment, water and various modifiers.

PRIOR ART

U.S. Pat. No. 3,085,912 discloses an ink for printing on fluorocarbons containing a polytetrafluoroethylene dispersion, a ceramic oxide pigment, a binder (or thickener), a distilled water carrier, and a fluorocarbon wetting agent.

DETAILED DESCRIPTION

The present invention relates to an ink for decorating the exterior of articles coated with a fluorocarbon exterior using commercial cookware silkscreening equipment. Generally, the fluorocarbon exterior of the cookware is polytetrafluoroethylene, polychlorotrifluoroethylene or copolymers of either of these with hexafluoropropylene or a perfluoroalkylvinyl ether wherein the perfluoroalkyl group contains from 1 to 4 carbon atoms.

There are several critical operating parameters of an ink for this end use. The first parameter is rheological thixotropy which will allow flow through a fine silk screen when shear is applied but of sufficient non-shear viscosity and recovery so as not to bleed through the silk screen or run on the cookware and distort the image being applied. This property is supplied to the ink of the present invention by incorporating therein from 1.5 to 4.0 parts, of an acrylic polymer latex. The acrylic latex exhibits thixotropic properties and thermal dimensional properties.

The ink should also wet the surface of the fluorocarbon which is being printed on. This is achieved by addition of 1.3 to 3.3 parts of a non-ionic surfactant such as an octyphenol polyether-alcohol commercially available as Triton-X100.

Another parameter required of the ink is adhesion to the surface with reasonable scratch resistance. This parameter is supplied to the ink of the present invention by incorporating in said ink from 2.0 to 3.0 parts of finely divided particles of polytetrafluoroethylene, polychlorotrifluoroethylene or copolymers of tetrafluoroethylene with up to 20 weight percent of either hexafluoropropylene or a perfluoroalkylvinyl ether in which the alkyl group contains from 1 to 4 carbon atoms.

Generally the ink will contain from 4.0 to 5.0 parts of an alcohol having 7 to 12 carbon atoms to modify the surface tension of the ink and thereby prevent the ink from pulling back with the screen from the surface being printed.

Generally, the ink will contain from 10.0 to 15.0 parts of ethylene glycol to control the evaporation rate of the ink.

Generally, the ink will contain from 2 to 10 parts of a colorant. Due to the fact that the ink will be cured at 400° to 430° C., the colorant must be able to withstand these temperatures. Further, since the ink will most often be used on cookware, the colorant normally should be non-toxic. Suitable colorants include, but are not limited to, carbon black and titanium dioxide.

The viscosity of the ink is controlled by the amount of water used. Generally the ink will contain from 20.0 to 50.0 parts water. The viscosity of the ink generally is from 3,000 to 8,000 cps.

The ink is applied to the substrate at ambient temperature through a silk screen to leave a deposit. The ink is then heated at 400° to 430° C. for from 3 to 5 minutes.

Preferred substrates for the ink are the multilayer coatings containing mica as disclosed in U.S. Pat. Nos. 4,049,863; 4,123,401; 180,609 and 4,351,882.

EXAMPLES

EXAMPLE I

An ink is prepared by mixing 28.47 weight percent of a copolymer containing 36 weight percent butyl acrylate, 47 weight percent ethyl acrylate, 16 weight percent ethylene glycol diacetate (EDDA) and 1 weight percent acrylic acid, 4.20 weight percent of a 60% solids dispersion polytetrafluoroethylene fine power; 2.82 weight percent of Triton-X100 (an octylphenol polyether alcohol surfactant); 4.91 weight percent of 2-ethyl hexanol, 12.24 weight percent of ethylene glycol; 9.30 weight percent of channel black dispersion containing 16 weight percent channel black dispersed in water; and 38.06 weight percent deionized water. The thusly prepared ink was silk screened onto a panel coated with a multilayer fluorocarbon coating as described in U.S. Pat. No. 4,351,882. The ink was heated at 400° C. for 5 minutes to fuse the fluorocarbon and carbon particles while driving off the remaining ingredients which were in the ink. The applied indicia had a smooth appearance and adhered well to the coated substrate.

EXAMPLE II

Example I is repeated except that the 28.47 weight percent of copolymer was replaced with 28.47 weight percent of a 13.6% solids aqueous latex of a copolymer containing 64 weight percent ethyl acrylate and 36 weight percent methyl methacrylate. Again the ink indicia had a smooth appearance and adhered well to the substrate.

I claim:

1. An aqueous ink having a viscosity of from 3,000 to 8,000 centapoises containing from 1.5 to 4.0 parts of an acrylic copolymer thixotropic agent, from 2.0 to 3.0 parts of finely divided fluorocarbon resin particles, from 1.3 to 3.3 parts of a non-ionic surfactant, from 4.0 to 5.0 parts of an alcohol containing 7 to 12 carbon atoms, from 10 to 15 parts of ethylene glycol, up to 10 parts of an inert colorant and about 20 to about 50 parts of water.

2. An article having a fluorocarbon surface having indicia formed on such surface formed of the ink of claim 1.

* * * * *